United States Patent
Grisoni

(10) Patent No.: US 7,436,642 B2
(45) Date of Patent: Oct. 14, 2008

(54) SOLID STATE AC SWITCH

(76) Inventor: Massimo Grisoni, 27, Via G. Ferri, Lugano (CH) 6900

( * ) Notice: Subject to any disclaimer, the term of this patent is extended or adjusted under 35 U.S.C. 154(b) by 56 days.

(21) Appl. No.: 11/365,587

(22) Filed: Mar. 2, 2006

(65) Prior Publication Data

US 2006/0203409 A1 Sep. 14, 2006

Related U.S. Application Data

(63) Continuation-in-part of application No. 10/499,651, filed as application No. PCT/IT03/00010 on Jan. 14, 2003, now abandoned.

(30) Foreign Application Priority Data

Jan. 15, 2002 (IT) .............................. BS02A0002

(51) Int. Cl.
*H02H 3/08* (2006.01)
(52) U.S. Cl. ....................................... 361/93.1
(58) Field of Classification Search ................. 361/93.1
See application file for complete search history.

(56) References Cited

U.S. PATENT DOCUMENTS

| | | | |
|---|---|---|---|
| 3,868,551 A | 2/1975 | Spary | |
| 4,038,640 A | 7/1977 | Lee et al. | |
| 4,410,924 A | 10/1983 | Hewitt et al. | |
| 4,633,161 A | 12/1986 | Callahan et al. | |
| 4,939,437 A | 7/1990 | Farag et al. | |
| 5,140,394 A | 8/1992 | Cobb, III et al. | |
| 6,316,965 B1 * | 11/2001 | Jonker et al. | 326/134 |
| 6,667,866 B1 * | 12/2003 | LaPlace et al. | 361/87 |
| 6,697,244 B1 | 2/2004 | Bauer et al. | |

FOREIGN PATENT DOCUMENTS

DE 19842470 3/2000

* cited by examiner

*Primary Examiner*—Michael J Sherry
*Assistant Examiner*—Lucy Thomas
(74) *Attorney, Agent, or Firm*—Shoemaker and Mattare

(57) ABSTRACT

An electronic switch for AC currents has only solid state components, including a main bipolar or unipolar switch circuit to switch AC current from an AC line to a load, at least one current limit circuit, a current measurement circuit, a current range setting circuit, a maximum current setting circuit, and a temperature control circuit. All these circuits are controlled by a control logic circuit intended mainly to open and close the switch circuit by means of a manual command and/or according to signals from the circuits.

13 Claims, 6 Drawing Sheets

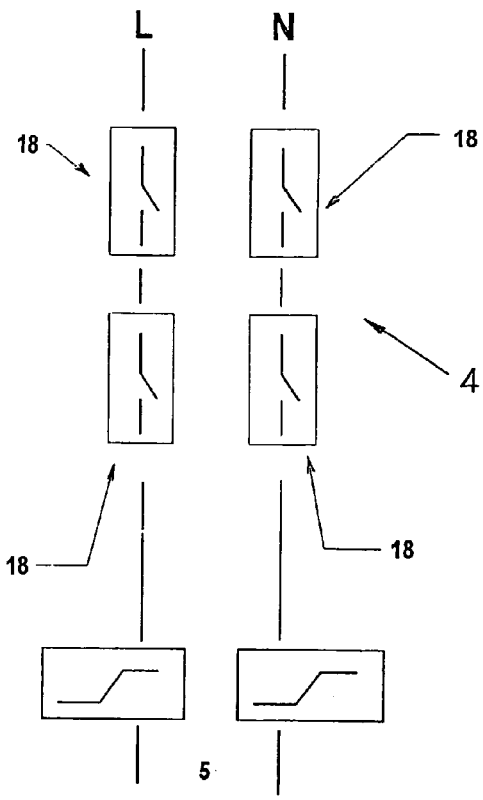
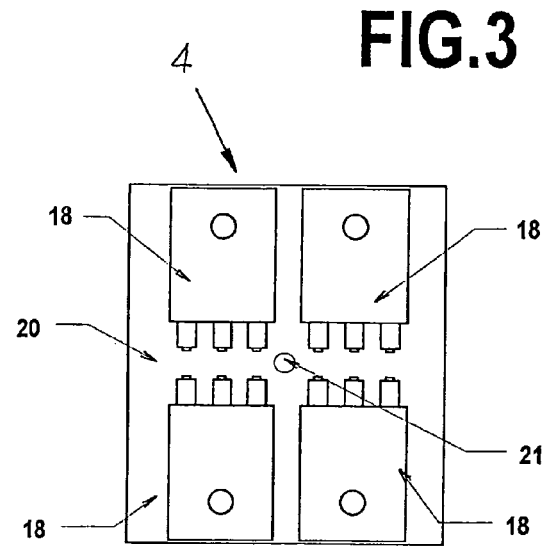
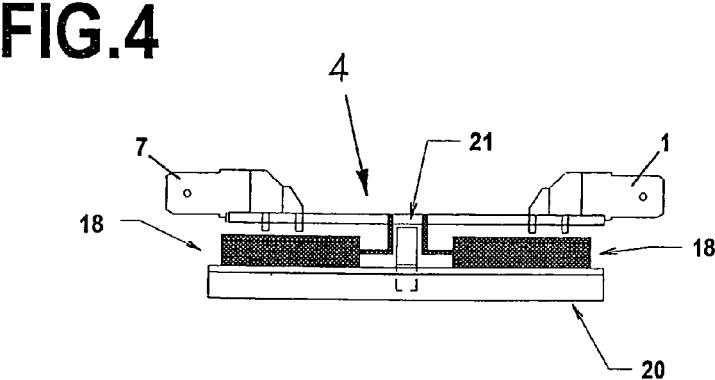
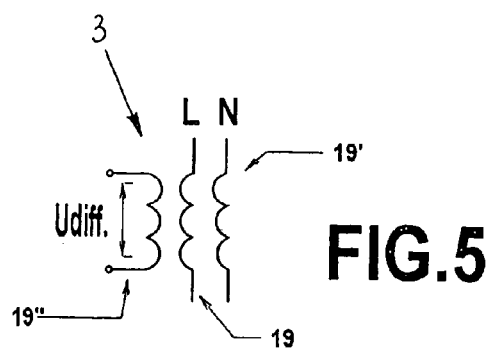

SOLID STATE AC SWITCH

This application is a continuation-in-part of copending application Ser. No. 10/499,651, filed Oct. 21, 2004, now abandoned which was the U.S. national stage of international application PCT/IT2003/000010, filed Jan. 14, 2003.

FIELD OF THE INVENTION

The present invention refers to a solid state power switch for alternating currents with the control of the current flowing into a load and the leakage currents of the AC line, with the capability to manage inrush or over currents and detect dead short or abnormal current, actionable by a local manual push-button or by a remote signal, realized with reduced dimensions and weights if compared to an actual electromechanical device, and intended to be used in any applications where there is the need to install a fully solid state electronic switch robust, reliable, designed for hard environmental installations in order to achieve long life, with quiet and safe operation for a complete control of the plant.

BACKGROUND OF THE INVENTION

Conventionally, the AC voltages are controlled by electro-mechanical breakers or electronic devices also called Solid State relays, hereinafter SSR. The electromechanical breakers do not offer a protection to the load and to the line and an information about the state of the AC line or the current flowing into the load; these performances are reached only if these devices are used jointly with other units based on thermal or magnetic principles, but always mechanical devices, or with normal fuses, anyway devices that in a plant must be added to the main breaker increasing dimensions, costs, and wiring complexity.

Then, all these electromechanical devices have anyway a short and not constant operating life caused by the mechanical construction of the opening/closing mechanism of the contacts, subjected to a derating performance, specially if installed in a plant with presence of noises or temperature and humidity stresses and vibrations. Furthermore, due to the increasing presence inside the electrical boxes of others electronic devices, it has become an increasingly common requirement to reduce the electromagnetic noise that appears during opening/closing of mechanical contacts.

Furthermore, the use of SSR switches, as far is concerning the electromechanical noise, is very critical because they have a high noise factor, and also the SSR do not warrant a better protection of the load against over currents because they operate slowly in case of short circuit failure or over currents detection. The SSR, again, can not be used in an electrical installation for monitoring the load efficiency or current flow if not properly connected to an external and added electronics.

SUMMARY OF THE INVENTION

The present invention relates to a solid state switching apparatus that can solve all the problems of the mechanical construction of actual breakers, specially if used in hard environments.

The switch of the invention can control the load and the AC line in any electrical installation where the actual breakers does not satisfy the requirements or must be used jointly with other devices or electronics parts.

With advances in solid state power switching technology, these problems can be now solved and the present invention relates to a practical approach of the problem presenting a solid state switch for alternating currents that can substitute the actual electromechanical devices and SSR with advantages.

A first object of the present invention is to provide a solid state switch, without any mechanical parts, applicable to an alternating voltage that can easily and with convenience substitute the functions performed by the electromechanical devices and SSR.

Another object of the invention is to provide a solid state switch for alternating currents that can be activated manually and/or by a remote command without the use of such mechanisms for the opening/closing operations.

Still another object of the invention is to provide a solid state switch for alternating currents that can measure the currents flowing into the load. And the line leakage current.

Still another object of the invention is to provide a solid state switch for alternating currents that can manage abnormal currents, like over current, spikes, inrush currents and dead short or abnormal current or short circuits currents for an indeterminate time without problems.

Still another object of the invention is to provide a solid state switch for alternating currents with high immunity to external environmental factors and not generating electromagnetic noise by itself.

Still another object of the present invention is to provide a solid state switch for alternating currents with weights, dimensions and costs reduced if compared with a traditional electromechanical devices.

Still another object of the present invention is to provide a solid state switch for alternating currents that can present to the user, by means of lamps, an indication of its state.

Still another object of the present invention is to provide a solid state switch for alternating currents that can increase the safety in an installation, reduce maintenance and positively influence the costs of maintenance.

Still another object of the present invention is to provide an AC power switch that can simply replace an electromechanical breaker.

Still another object of he present invention is to provide an AC power switch with a high environmental degree of protection of the body against ambient factor and particularly against the vibration, due to the rugged and robust construction, and to the absence of screws for the cable connections.

According to the present invention, these objects are achieved with a solid state AC switch for alternating currents made only with solid state components, controlled by an electronic circuit, and realized with special solutions for safety, reliability and protections required for a safe use with alternating currents.

BRIEF DESCRIPTION OF THE DRAWINGS

FIG. 2 is a schematic view of the main switch circuit;

FIG. 3 is a plan view from above of the main switch circuit;

FIG. 4 shows, in side view, the main circuit switch of FIG. 3;

FIG. 5 shows a schematic circuit for the measurement of the AC line leakage current;

DESCRIPTION OF THE INVENTION

The solid state AC switch for alternating currents hereinafter described can be used with advantages in many applications.

Figure 1:
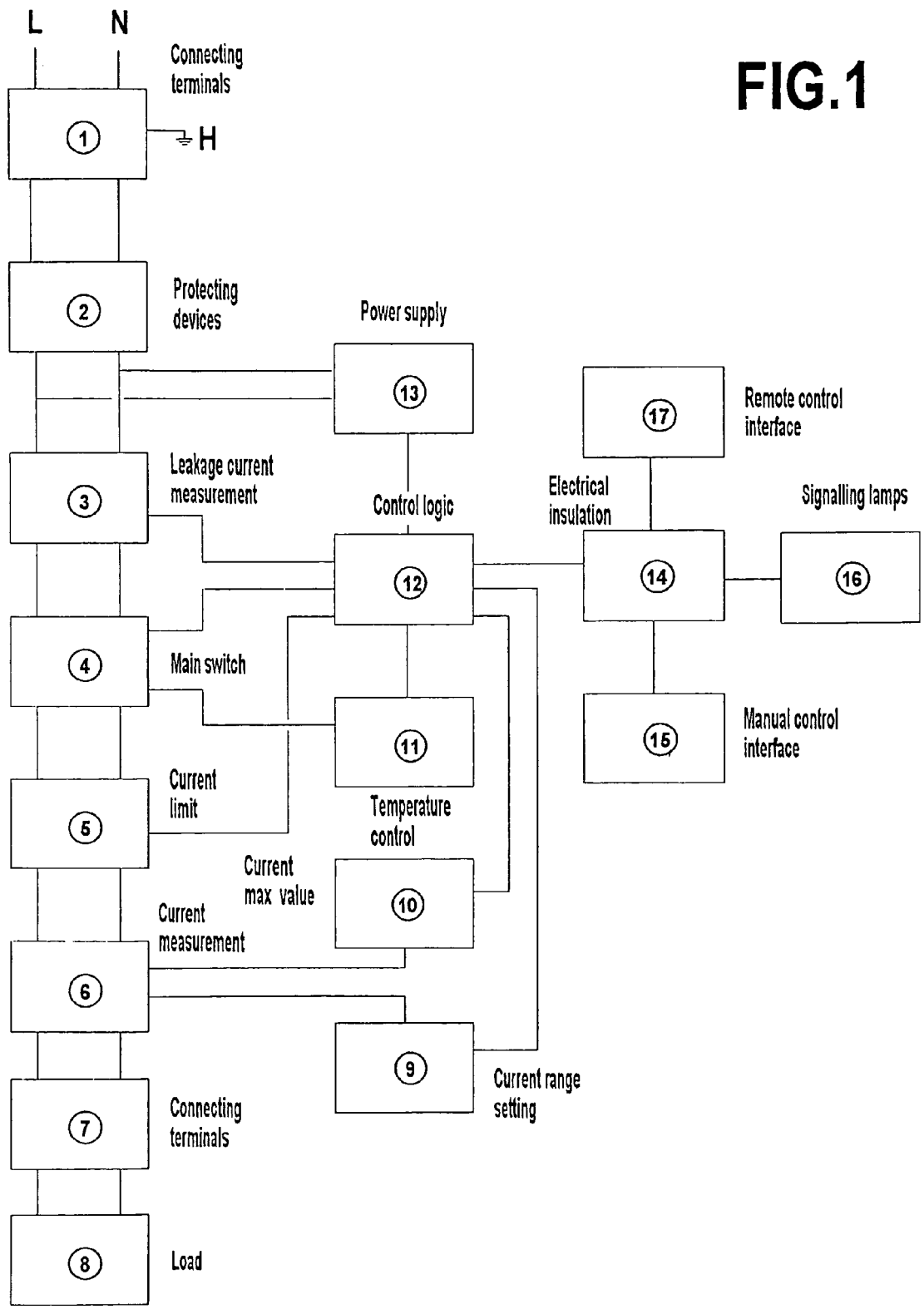
FIG. 1 is a block diagram of a solid state AC switch according to the invention.

The block diagram of FIG. 1 shows generically an application on an electrical alternating single phase line to power a load 8 in which all the two lines L (Line) and N (Neutral) are controlled by a main switch circuit 4 equally realized for the two AC lines L and N but in case applicable also to a single line.

With reference to FIG. 1, the conductors of said AC lines L and N and the electrical ground line H are connected to the solid state AC switch by means of proper connecting terminals 1, 7, specially designed for this application to be resistant to vibrations and temperatures stresses.

From said AC lines an internal protected power supply 13 generate all the voltage necessary for the circuitry of the solid state AC switch.

The solid state AC switch itself and the load are protected by an usual and opportune protecting device 2.

Connected to the AC lines L and N, can be inserted a circuit for measuring the leakage current 3 as the difference of the current flowing in the said lines.

The main switch circuit 4 is the most important part of the AC solid state switch; it's realized by using power FET's transistors 18 fixed on an appropriate heatsink 20 necessary to waste the heat generate in abnormal conditions.

According to a first embodiment represented in FIG. 1, the load 8 is controlled by a current limiter circuit 5 and by a current measurement circuit 6; the current measurement circuit 6 is connected to a circuit for current range setting 9 used to select different ranges of currents in a same solid state AC switch.

The switch also includes a temperature control circuit 11 designed to protect the main switch circuit 4 to halt the current flow in case of abnormal rising in temperature.

The circuits 3, 5, 9, 10 and 11 are connected to a control logic circuit 12 intended mainly to open and close the load 8 by driving directly the transistors 18 of the main switch circuit 4, on request of a command from the user and/or according to signals from circuits 3, 5, 9, 10 and 11.

Resuming, the control logic circuit 12 has the following functions:

maximum allowable leakage current control,
limit current signal control,
current range setting control,
maximum current control,
heatsink maximum temperature control,
interface signal control,
opening/closing of the circuit switch 4.

All the functions of the control logic circuit 12 can be achieved with analog devices in which the values, for example, of the timers or of the current threshold or voltages references are obtained with capacitor or precision resistances; the same functions should also be obtained with the use of a more flexible and programmable control logic unit in which all the parameters like threshold, timers, settings and others more complex functions should easy better implemented and programmed or modified. The main switch circuit 4 can be manually operated or can be under the control of an electrical signal.

For this purpose, the AC solid state switch, as explained in this application, is provided with a manual control interface circuit 15 provided with a pushbutton to activate and deactivate the load and with a remote control interface circuit 17 designed to control the AC solid state switch functions by means of an on/off command line and others signal lines.

The AC solid state switch is provided of signalling lamps circuit 16 provided with lamps to be used to inform about the device functionality. Particularly it's expected that the lamps indicates the connection of the switch to the AC line, the opening/closing or halt state if eventually occurred in protection mode.

The lamps can be illuminated in a fixed or blinking mode when abnormal conditions are detected.

The interface circuits 15 and 17 and the signalling circuit 16 are electrically separated from others circuits connected to the AC voltages by an electrical insulation circuit 14 made of optoisolators.

The AC solid state switch is completed with a low voltage power supply circuit 13 for powering with three separate output DC voltages all the internal circuits. Of three DC low voltages, one of them is used exclusively for power the control logic 12, the second for the circuits related to the L AC line and the third to the N AC line.

For a deeper knowledge of the invention, FIGS. 2, 3 and 4 relating to the main switch circuit 4 have now to be referred to.

One of the solid state switching components most adaptable for alternating currents applications is the power field effect transistor (FET). Two unidirectional low costs power FET's 18 forms the main switch circuit 4 and are fixed on the heatsink 20.

On each AC lines L and N, the main switch 4 consists of two power FET or IGBT transistors 18 connected in series in a back to back configuration. These transistors 18 have a similar arrangement to avoid that different temperature steps, subsequent to the wasted power during protection phase and less in normal operation, can produce problem to the AC solid state switch. For this purpose, the transistors 18 are fixed on the heatsink 20; the main function of this heatsink is to collect and quickly and equally distribute as far is possible on the whole volume the heat quantity as integrator of the heat wasted by the transistors 18 in the worst case of short circuit current. This heatsink is made of a block of hard metal with strong thermal conductivity to quickly accumulate into its volume the heat generated by the transistors 18, protecting them particularly when overcurrent or current short circuits or high gradient temperature are present.

Inserted inside the heatsink 20 there is a temperature sensor 21 as protecting device of circuits against extreme working temperatures; the control logic circuit 12 monitors the temperature of the heatsink 20 to preserve the internal power FET's junction temperature opening definitely the main switch circuit 4.

The heatsink time constant is dependent from the power FET's transistors 18 thermal characteristics, from the setup time of the temperature sensor 11, and from the speed of the control logic circuit 12. The choice of the two power FET's transistors 18 in the main switch circuit 4 has been selected for the good voltage blocking capability for both polarity of the supplied alternating current, one power FET providing blocking during half cycle of one polarity and the other power FET providing blocking during half cycle of the opposite polarity. Then the blocking capability of the power FET's has been also improved by the use of a very simple and quick circuitry for detection of limit current 5 and with the design to activate the load on zero crossing of the alternating current then verifying any malfunction when the voltages are again relatively low.

The current limiter circuit 5 is capable of detecting easily and speedily like overcurrent caused by a dead short or abnormal currents caused by short circuit failure or momentary resistance short circuit.

The combination of the performances of the power FET's transistors 18 types, the current limiter circuit 5 design and the heatsink 20 design allow to realize a very resistant solid state AC switch with an high and safe breaking capability.

The worst case of a dead or short circuit should appears with causality at the top of cycle when the voltages reaches the maximum value Vpp; anyway, also this case is recovered after few microseconds by the control logic circuit 12.

The closing of the main switch circuit 4 is always active and only at the zero point of the cycle in order to test the subsequent eventual abnormal current at lower voltages of about 6-8 Vms. This solution reduce the power wasted on the heatsink and also permits a permanent short circuit condition for an indeterminate time.

The limit current circuit 5 is signalling to the control logic circuit 12 any current flow that overcomes the values settled in the current maximum value circuit 10 designed as a current source circuit with the values defined by the characteristics of the power FET's transistors 18 used and realized with a simple shunt resistance.

In particular, when the signal from limit current 5 is activated, a first timer located inside the logic circuit 12 starts its count down and still allows the flowing of an overcurrent or also of a short circuit current across the transistors 18, until its reset, for a very short time, in any case in the order of few microseconds; this time anyway shorter than the time supported by the transistors 18 in a similar critical situation of short circuit current state. A second timer, located again in the logic circuit 12, starts its count with the first; for all this second time the logic circuit 12 activates the main switch 4 and the first timer.

When the second timer is resetted, it sends to the main switch circuit 4 the command to open definitely the AC lines from the load 8.

This control allows both to insert loads that can require higher initial current spikes and to manage with better results the short circuit currents to safe load and line.

The current measurement circuit 6 is a separate circuit realized with a comparator and a pulse modulation design; the current value Ims measured by the current measurement circuit 6 is compared with a precision reference voltage in the current range circuit 9.

FIG. 5 discloses a principle of construction of the leakage current measurement circuit 3. The latter measures the leakage of the current of the AC lines L and N detecting the current difference flowing across these conductors using three coils 19, 19' and 19" combined and assembled on a separate circuit that also optionally can be inserted inside the solid state AC switch.

Particularly, if the voltage induced Udiff, measured on the coils 19" is greater than a maximum value Udiff MAX (depending on the characteristics of the installation) the loss of current of one of the AC lines L or N is too much and the main switch circuit 4 is opened by a proper command from control logic circuit 12.

Using the remote control interface circuit 17, this AC solid state switch can be activated by an external signal but others signal of the circuit 17 can be used to know the following functions:

the current flow,
over current state,
leakage current state,
higher temperature state,
malfunction state.

Figure 1A:
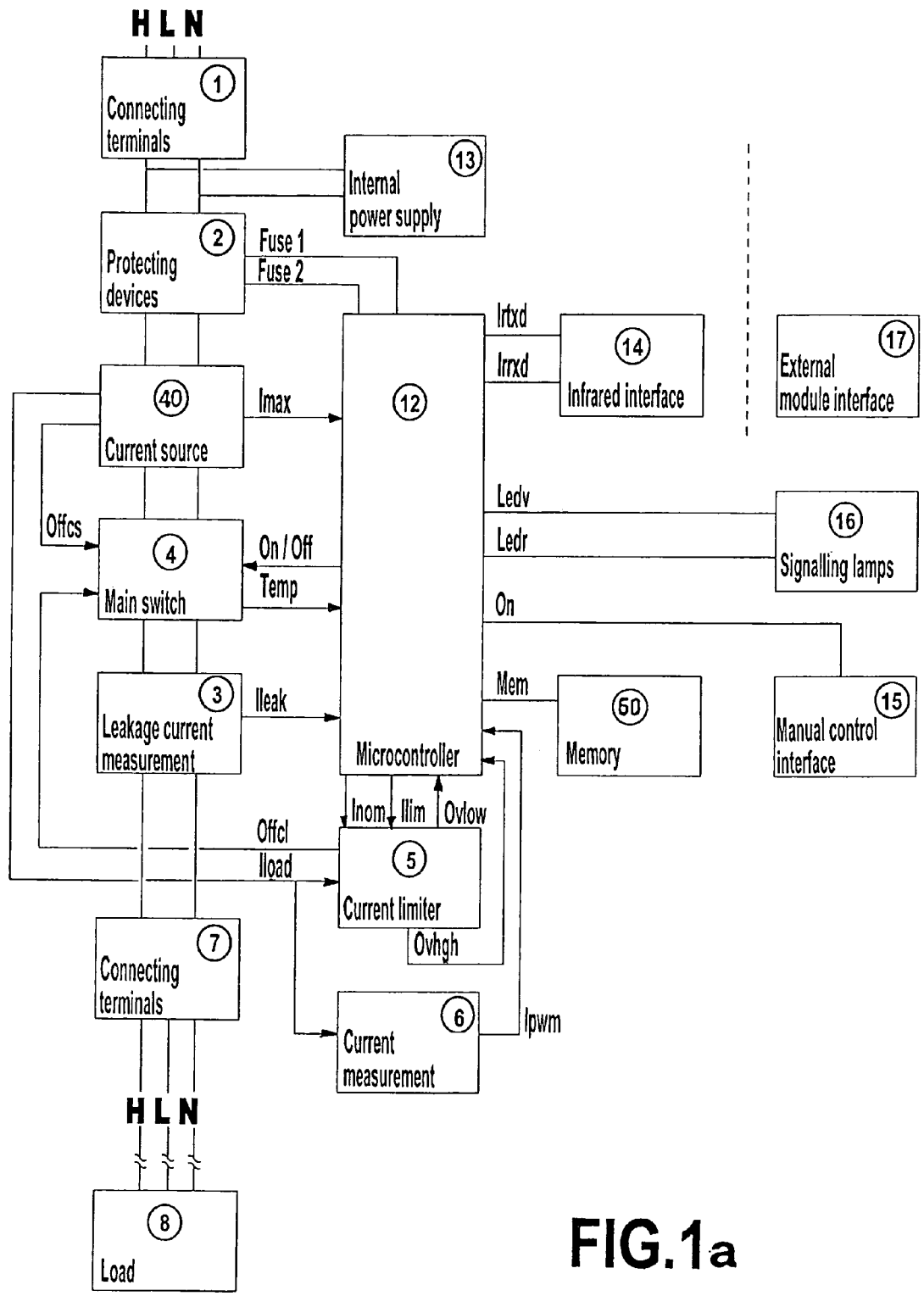
FIG. 1a is a block diagram of the solid state AC switch according to a preferred second embodiment.

The block diagram in FIG. 1a shows a second and preferred embodiment of the solid state switch according to the invention. The functional blocks in common with the first embodiment of the device are given the same reference numbers.

The control logic unit 12 is programmable for setting a main switch nominal current value (Inom), a limit current value (Ilim), which is comprised between said main switch nominal current value and said maximum current, a first time interval (Tlim1), a second time interval (Tlim2, and a third time interval (Tlim3).

Preferably, the limit current is the maximum current which can flow across the load without damaging it.

The reference level of the limit current Ilim and of the nominal current Inom can be realized easily with a normal voltage divider or can be programmed in a non volatile re-programmable resistor to enhance the performances of a fully programmable system.

Connected to the main switch 4 and to the control logic unit 12 there is provided a current source circuit 40 suitable to define the maximum current (Imax) that the transistors 18 can support in the poor working conditions.

The current source circuit 40 is realized by means of a pairs of shunt resistors (one for each couple of transistors 18) and small relevant components used to manage the voltage across the shunts and to detect the maximum current Imax and the load current Iload.

Imax is defined in the current source circuit 40 when the voltage across the shunts reach the value of 0.6 Volts. In this situation the current source circuit 40 opens with the line Offcs the Main switch 4 and set up the signal Imax for the Control logic unit 12.

Iload is the value of the current crossing the Load 8 and is used by the circuit Current limiter 5, the current source circuit 40 and the circuit Current measurement 6.

The circuit Current measurement 6 generates a pulse width modulation signal Ipwm derived from the signal Iload and destinated to the Control logic unit 12 that calculates the value in terms of Ieff.

Figure 8:
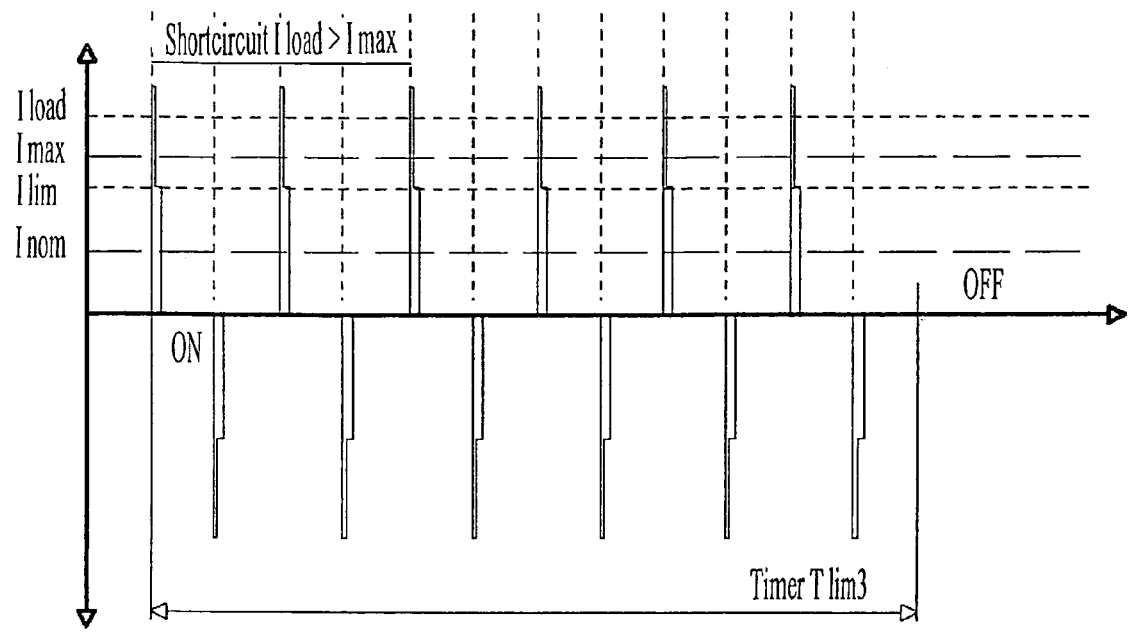
FIG. 8 is a diagram representation of the protection procedure for a short circuit situation.
Figure 10:
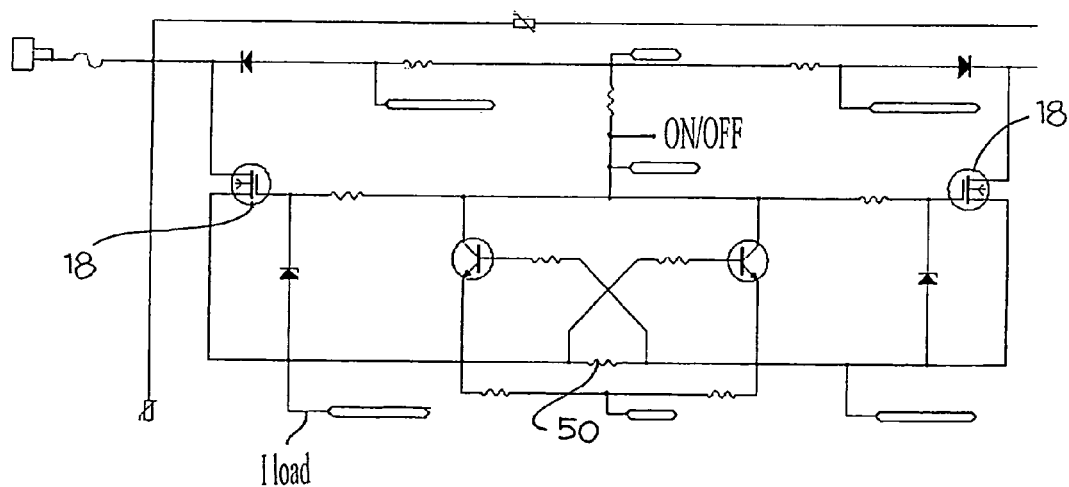
FIG. 10 is the electrical scheme of the current source circuit of the switch.

Current source circuit 40 immediately opens the transistors 18 and generate an Imax signal when the current overpasses the safety level represented by Imax, as depicted in FIG. 08.

The Current limiter circuit 5 operates for protecting the device from inrush current and against short circuit.

It is known that, in presence of an inrush current, the actual electromechanical breakers response is dependent from the mechanical construction of the bimetal blade. The standard response-curves (B, C, K, Z, . . . ) of an electromechanical breaker are used to match a particular load with the breaker.

According to the invention, the solid state switch here proposed is designed to reacts to an inrush current with a software simulation of said curves. For this purpose, some parameters have been defined that have to be programmed in the Control logic unit 12 by use of the External module interface 17 and used to manage the inrush current.

These parameters classify all the inrush currents as low and high over current and short circuit conditions depending from the load current level and are defined by the above mentioned Tlim1, Tlim2, Tlim3 and Inom and Ilim.

As an example, if the nominal current of the switch is 5 A (Amperes), Ilim can be settled to 7 Amps, Tlim1 to 500 ms, Tlim2 to 120 ms and Tlim3 to 10 ms.

Returning again to current limiter circuit 5, this circuit is made with high speed comparators realized to control the levels of the currents Ilim, Inom and Iload.

In more details, inside the Current limiter 5 there are two separate comparators: the first is used for the high over current condition when Iload>Ilim and the other one for the low over current condition when Iload>Inom.

Figure 6:
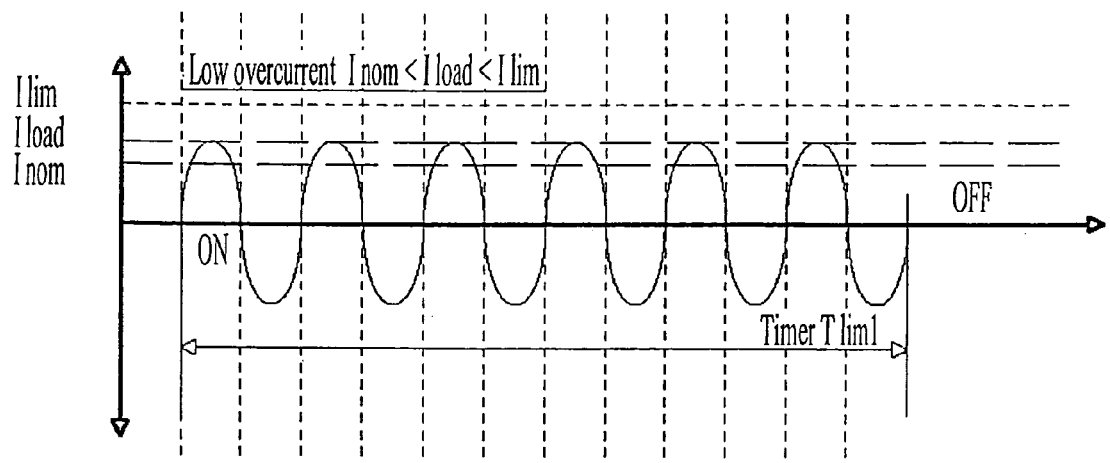
FIG. 6 is a diagram representation of the protection procedure for a low over current situation.

When a low over current condition is detected, the control logic unit 12 reads the line Ovlow, settled by the circuitry of the Current limiter 5, and activates the timer Tlim1, as represented in FIG. 06. The switch is in a low over current status because the nominal value of the current has been overpassed. The time Tlim1 is activated and the overcurrent status is maintained until Tlim1 elapses. After this time, the switch should run normally if Iload<Inom or should be definitively opened by the command On/Off that the Control logic unit 12 sends to the circuit Main switch 4.

When an high over current condition is detected by the current limiter 5, the latter sets the line Offcl which causes the Main switch 4 to open the transistors 18. The control logic unit 12 then reads the line Ovhgh, also settled by the current limiter circuit 12, and initiate the procedure for detecting this abnormal situation for the time Tlim2, activating the main switch at every cycle. After this time, the switch should run normally if Iload<Inom or should enter into the low over current condition if Iload<Ilim but Iload>Inom, or should be definitively opened by the command On/Off that the Control logic unit 12 sends to the circuit Main switch 4.

If the inrush current is initially greater than Imax, then the short circuit procedure is activated with the time Tlim3. During the short circuit status, the current fixed by the shunt resistors 50 operates on the transistors 18 and directly opens immediately the Main switch 4 at each cycle. The sequence is carried out for the time Tlim3 and initiates on the zero crossing of the subsequent cycle.

It should be noted that normally an inrush load starts with a short circuit situation then passes to an high to low over current situation to reach the normal operation.

Figure 7:
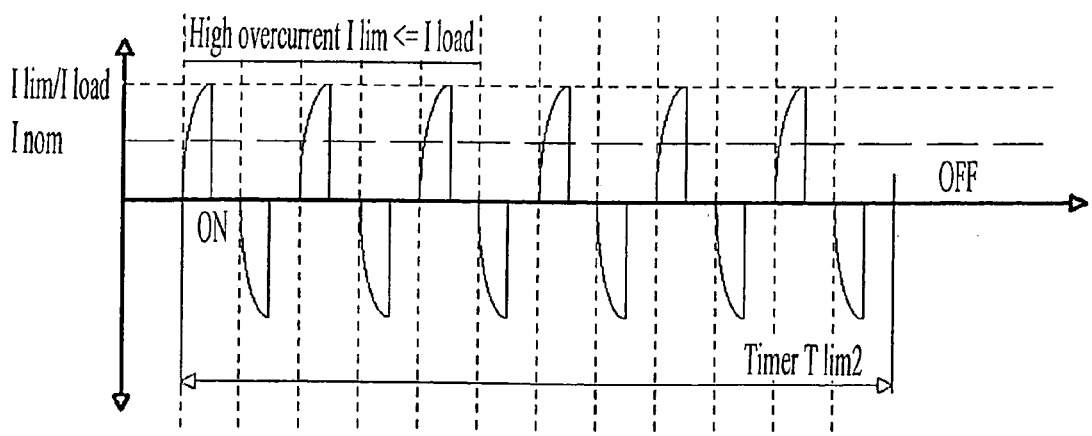
FIG. 7 is a diagram representation of the protection procedure for an high over current situation.
Figure 9:
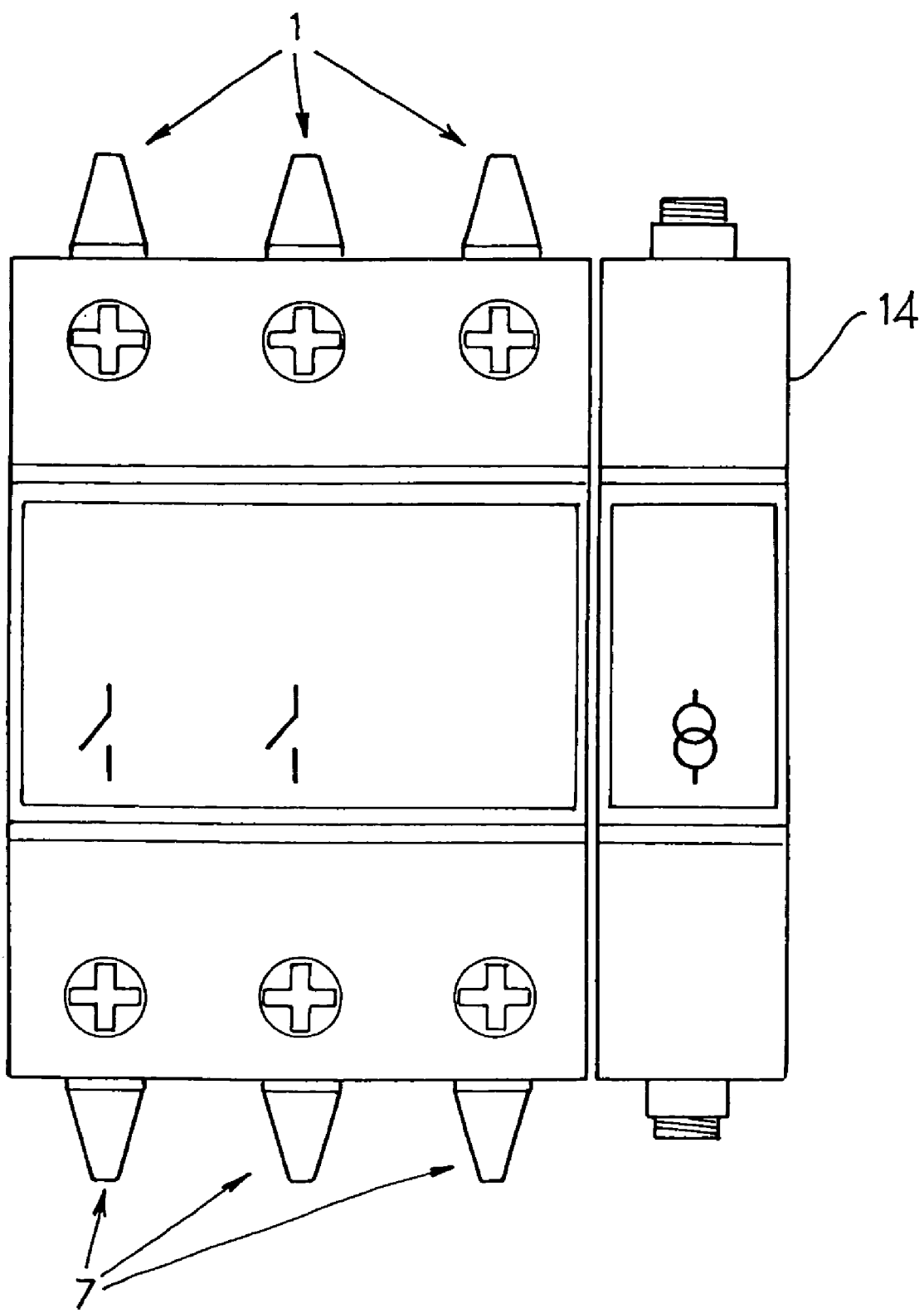
FIG. 9 shows, in top view, an example of the main circuit of the switch.

The difference between the management of the two over current condition is that, for the high over current, as represented in FIG. 7, the Load 8 is immediately separated with a procedure similar to that used for the short circuit condition.

FIGS. 6, 7 and 8 demonstrate the behavior of the AC solid state switch when abnormal current flows are detected. In particular, in FIG. 6 a low over current condition is detected when Inom<Iload<Ilim<; FIG. 7 represents an high over current condition is with Ilim<Iload and finally FIG. 8 represent the protection in case of a short circuit condition Iload>Imax.

It should be noted that, for safety reason, the detection of a short circuit condition is managed with priority and velocity by the current source circuit 40 and does not depend from the activity of the Control logic unit 12.

The circuit main switch 4 can be manually operated or can be under the control of an electrical signal.

In particular, and with reference to FIG. 2, the circuitry of the Main switch 4 operates for the detection of the signal ON/OFF coming from the control logic unit 12 and the signals Offcs and Offcl coming from circuit Current source circuit 40 and Current limiter 5, respectively.

The signal Temp is derived from the temperature sensor 21

The signal ON/OFF coming from the control logic unit 12 is controlled by the internal software routines and acts only when normal operation is in progress. This signal serves for the activation/deactivation of the main switch 4.

It should be noted that the control logic unit 12 has only supervision functions that cannot interfere with the switch functionality when abnormal currents could be present. Because based on the software-firmware routines, the control logic unit 12 is not used for high speed intervention.

The device according to the invention applies the digital technology with care and never for the switch life functions. These functions are under direct control of the logic circuits located in the Current source circuit 40 and in the Current limiter 5.

It has been decided to manage in this way the switch because, specially at the start, or when short circuit condition is present, the currents generate high disturbing spikes that could activate the internal watch dog or interrupt or reset functions of the control logic unit 12 with a consequent loss of a necessary immediate intervention (calculated in the order of few microseconds) and dramatic results for the life of the main switch 4.

The solid state AC switch is provided in the circuit for the manual control interface 15 with a pushbutton to activate and deactivate the load and with circuit signalling lamps 16 to inform about the device functionality.

Particularly it is expected that the lamps indicate the connection of the switch to the AC line, the opening/closing and all situation occurred in protection mode.

The remote control of the switch is obtained using an Infrared interface 14 between the control logic unit 12 and the External module interface 17. This solution simplifies the component count and particularly the optocoupler section normally used to separate the high voltage section to the low voltage section. The use of a control logic unit 12 implies the management of a lot of data that are transferred by the Infrared interface 14 to the External module interface. All the parameter are programmed by the use of the External module interface 17 and the functionality of the switch can be obtained as standalone module with manual control and command by using the Manual control interface 15 and Signalling lamps 16 or as integrated in a network when mounted near the External module interface 17.

The infrared interface has been selected also to avoid mechanical connectors between the main body of the switch and the Interface Module 17. With this solution it has been obtained also a waterproof protection level.

The power supply necessary for the Interface Module 17 is derived from an external network bus or connection.

With the implementation of a networking-bus protocol it has been defined a product that can be programmed and controlled by software and can be use as a network or standalone product.

The device programming parameters are programmed in a memory 60 of the control logic unit 12 from an external system trough the use of the external module interface 17.

The memory 60 is also used for memorize the operating status of the switch in case of black out.

For a rugged realization, all the electronic cards of the device are assembled in an epossidic resin block. This solution assures better performance against environmental factor and define a product line specially designed for marine application.

APPLICATION EXAMPLES

This invention relates to a solid state electronic breaker for AC currents with innovative concepts as far is concerning marine applications.

The marine installation are subject to vibrations, temperatures stresses, humidity, salt and electromagnetic noises and the cabling is always complex and heavy.

The AC switch according to the invention is a solid state electronic breaker designed for this kind of marine application to avoid the problem today present on ships like space, reliability, weight and dimensions, safety, maintenance, to reduce fire risk, to increase safety on board for the automatic maintenance capability and device auto diagnosis.

Some of the characteristics of the AC solid state power switch can be better illustrated with the following application examples.

When the external system sends the command to activate the Load 8, at the same time it can verify if the AC line does not have current leakage, measured by the circuit Leakage current 3 and transferred by the Infrared interface 14 to the external module interface 17.

This characteristic allows to know the AC line state at every activation command and during all the activation time of the Load 8 and allows too to inform the operator what AC electrical line inside the plant has problems for a quick and safe maintenance.

This capability is very important if the switch is installed in a complex plant and exposed to a severe environmental conditions and subject to a safety rules as the marine electrical installation require.

To be note that, if a leakage on the AC lines is detected also without an external system, when the operator acts on the pushbutton to activate the switch, the signalling lamp starts blinking and the load is immediately disconnected.

A second example illustrate the way a load can be activated.

If the load is an incandescent lamp, as well known its resistance is like a short circuit when cool. The Current source circuit 40 activates the short circuit protection when detects the current Iload over the level Imax; immediately the Current source 40 protects the transistors 18, then, on the next cycle, the control logic unit 12 activates the Main switch 4 and the sequence is repeated until the time Tlim3 is elapsed or the level of Iload is reduced to a safe condition (as in FIG. 8).

If the current Iload decreases, then the high over current protection is activated; the behavior is illustrated in FIG. 7.

The current Iload, if higher than the current limit Ilim, is limited to Ilim; the Current limiter circuit 5 protects again the transistors 18.

The control logic unit 12 detects on the line Ovhgh the high over current protection and starts with the time Tlim2 a sequence of repetitive guesses.

To the control logic unit 12 is dedicated only the supervision of the switch functions but not the direct control of the currents and the protections; these functions are realized by means of discrete electronic components.

With a similar behavior operates also the low over current protection when the Current limiter circuit 5 detects a value of Iload lower than Ilim but again higher than Inom but dangerous for the load (FIG. 6).

The invention claimed is:

1. Electronic switch for AC currents, comprising
a main bipolar or unipolar switch circuit to switch the AC current from an AC line to a load the main switch circuit including at least a pair of power FET or IGBT transistors for each AC line;
a current measurement circuit;
a current source circuit comprising, for each pair of transistors, a shunt resistor defining the maximum current (Imax) that the main switch can support, said current source circuit being directly coupled to said main switch and arranged such that when crossed by said maximum current the current source circuit generates a voltage suitable for causing the opening of the main switch;
a control logic unit programmable for setting a main switch nominal current value (Inom), a limit current value (Ilim) which is comprised between said main switch nominal current value and said maximum current, a first time interval (Tlim1), a second time interval (Tlim2) and a third time interval (Tlim3),
said control logic unit being operable for opening and closing said main switch;
a current limiter circuit suitable for comparing the AC current with said nominal current and with said limit current, said current limiter being arranged for sending a corresponding command signal (Ovlow, Ovhgh) to the control logic unit and for directly opening the main switch;
wherein, in presence of an inrush current,
if said inrush current is higher than the maximum current, a short circuit procedure is activated by the current source circuit, wherein the current source circuit acts to directly open the main switch and activates the control logic unit to trigger said third time interval and to close said main switch circuit at the zero crossing of each cycle of the AC current until said third time interval elapses;
if said inrush current is lower than the maximum current but higher than the limit current, a high over-current procedure is activated by the current limiter circuit, wherein the current limiter circuit acts to directly open the main switch and activates the control logic unit to trigger said second time interval and to close said main switch circuit at the zero crossing of each cycle of the AC current until said second time interval elapses;
if said inrush current is lower than the limit current but higher than the nominal current, a low over-current procedure is activated by the current limiter circuit, wherein said current limiter circuit activates the logic control unit to trigger said first time interval and to close the main switch until the first time interval elapses,
and wherein, in each said procedure, if said inrush current does not decrease below the lower value of the corresponding range before the corresponding time interval elapses, the logic control unit opens the main switch circuit definitively.

2. Electronic switch according to claim 1, wherein the control logic unit is programmable to drive the main switch in such a way that the wave form of the inrush current thus obtained simulates for each of the short circuit, high over current and low over current procedures, the standard response-curves of electromechanical breakers.

3. Electronic switch according to claim 1, wherein the limit current corresponds to the maximum current that can flow across the load without damaging it, and wherein the inrush current which is let to flow in the high over current procedure is cut off to said limit current value by the current limiter circuit.

4. Electronic switch according to claim 1, wherein said pair of transistors being fixed on a hard metal heatsink with high thermal conductivity or vented and provided with a temperature sensor inserted therein and connected to a temperature control circuit.

5. Electronic switch according to claim 4, wherein the current source circuit comprises a pair of shunt resistors for each pair of transistors of the main switch.

6. Electronic switch according to claim 1, wherein the current limiter circuit comprises at least two separate high speed comparator circuits, a first comparator circuit suitable for comparing the load current with the nominal current, a second comparator circuit suitable for comparing the load current with the limit current.

7. Electronic switch according to claim 1, wherein the reference level of the nominal current and of the limit current are obtained by means of a voltage divider.

8. Electronic switch according to claim 1, wherein the reference level of the nominal current and of the limit current are programmed in a non volatile re-programmable resistor.

9. Electronic switch according to claim 1, further comprising, connected to the AC lines (L and N), a circuit for measuring the leakage current as the difference of the current flowing in the said lines, said circuit including a coil on each AC line conductors and a separate coil in which the inducted voltage is proportional to the current difference between the L and N lines.

10. Electronic switch according to claim 1, further comprising a manual control interface circuit and a remote control interface for programming and controlling the control logic unit, said circuits being connected to the control logic circuit with the interposition of an electrical insulation circuit.

11. Electronic switch according to claim 10, wherein said electrical insulation circuit is an infrared interface.

12. Electronic switch according to claim 1, further comprising a signalling lamps circuit connected to the control logic circuit, said signalling circuit being provided with at least two lamps that combined and blinking or with continuous lights give information about the AC solid state switch connected to the AC line, activated, deactivated, or if protections operate or errors occur.

13. Electronic switch according to claim 1, further comprising a low DC voltage power supply circuit provided with one or more outputs electrically insulated from the AC line, one of them used for powering the control logic circuit and the others to power remaining circuits related to the alternating voltages of the lines L and N.

* * * * *